United States Patent
Yuki et al.

(10) Patent No.: US 10,941,368 B2
(45) Date of Patent: Mar. 9, 2021

(54) LUBRICATING OIL COMPOSITION COMPRISING DISPERSANT COMB POLYMERS

(71) Applicant: Evonik Operations GmbH, Essen (DE)

(72) Inventors: Tsuyoshi Yuki, Otsu (JP); Yasuo Arai, Ushiku (JP); Tomohiro Matsuda, Tokyo (JP); Nobuhiro Kishida, Tsukuba (JP)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/468,781

(22) PCT Filed: Dec. 15, 2017

(86) PCT No.: PCT/EP2017/083038
§ 371 (c)(1),
(2) Date: Jun. 12, 2019

(87) PCT Pub. No.: WO2018/114673
PCT Pub. Date: Jun. 28, 2018

(65) Prior Publication Data
US 2019/0367836 A1    Dec. 5, 2019

(30) Foreign Application Priority Data

Dec. 19, 2016 (EP) .................... 16205042

(51) Int. Cl.
| | | |
|---|---|---|
| *C10M 145/14* | (2006.01) | |
| *C10M 169/04* | (2006.01) | |
| *C08F 290/04* | (2006.01) | |
| *C10M 135/18* | (2006.01) | |
| *C10M 149/04* | (2006.01) | |
| *C10M 149/06* | (2006.01) | |
| *C10M 161/00* | (2006.01) | |
| *C10N 20/04* | (2006.01) | |
| *C10N 20/00* | (2006.01) | |
| *C10N 30/02* | (2006.01) | |
| *C10N 40/25* | (2006.01) | |

(52) U.S. Cl.
CPC ..... *C10M 169/044* (2013.01); *C08F 290/048* (2013.01); *C10M 135/18* (2013.01); *C10M 145/14* (2013.01); *C10M 149/04* (2013.01); *C10M 149/06* (2013.01); *C10M 161/00* (2013.01); *C10M 2203/003* (2013.01); *C10M 2209/084* (2013.01); *C10M 2217/023* (2013.01); *C10M 2217/024* (2013.01); *C10M 2219/068* (2013.01); *C10N 2020/04* (2013.01); *C10N 2020/071* (2020.05); *C10N 2030/02* (2013.01); *C10N 2040/25* (2013.01)

(58) Field of Classification Search
CPC .............. C10M 145/14; C10M 149/04; C10M 149/06; C10M 2209/084
See application file for complete search history.

(56) References Cited

U.S. PATENT DOCUMENTS

| | | | |
|---|---|---|---|
| 5,565,130 A | 10/1996 | Omeis et al. | |
| 5,597,871 A | 1/1997 | Auschra et al. | |
| 10,633,610 B2 * | 4/2020 | Scholler | C08F 290/048 |
| 10,731,097 B2 * | 8/2020 | Scholler | C08F 220/18 |
| 2008/0194443 A1 | 8/2008 | Stohr et al. | |
| 2010/0190671 A1 | 7/2010 | Stoehr et al. | |
| 2011/0306533 A1 | 12/2011 | Eisenberg et al. | |
| 2011/0319305 A1 * | 12/2011 | Eisenberg | C10M 145/14 508/463 |
| 2013/0079265 A1 * | 3/2013 | Eisenberg | C10M 149/00 508/500 |
| 2013/0196888 A1 | 8/2013 | Truong-Dinh | |
| 2016/0097017 A1 * | 4/2016 | Eisenberg | C08F 290/048 508/503 |
| 2019/0016987 A1 * | 1/2019 | Csihony | C10M 169/041 |
| 2019/0177641 A1 * | 6/2019 | Klein | C10M 169/041 |
| 2019/0300808 A1 * | 10/2019 | Sondjaja | C10M 107/28 |
| 2020/0216596 A1 * | 7/2020 | Scholler | C10M 169/041 |

FOREIGN PATENT DOCUMENTS

| | | |
|---|---|---|
| DE | 10 2009 001 447 | 9/2010 |
| EP | 3 093 334 | 11/2016 |
| JP | 2014-224246 | 12/2014 |
| JP | 2015-183123 | 10/2015 |
| WO | 2007/003238 | 1/2007 |
| WO | 2009/007147 | 1/2009 |
| WO | 2010/102903 | 9/2010 |
| WO | 2012/025901 | 3/2012 |
| WO | 2014/170169 | 10/2014 |

OTHER PUBLICATIONS

European Search Report dated Jun. 9, 2017 in European Application No. 16205042.1.
International Search Report dated Mar. 5, 2018 in PCT/EP2017/083038.
Written Opinion dated Mar. 5, 2018 in PCT/EP2017/083038.

* cited by examiner

*Primary Examiner* — Ellen M McAvoy
(74) *Attorney, Agent, or Firm* — Grüneberg and Myers, PLLC

(57) ABSTRACT

Selected comb polymers contain specified amounts of macromonomer and nitrogen-containing (meth)acrylates. Lubricant compositions can contain such comb polymers. The selected comb polymers can be used as solubilizers in lubricant compositions, especially in engine oil (EO) compositions.

20 Claims, No Drawings

LUBRICATING OIL COMPOSITION COMPRISING DISPERSANT COMB POLYMERS

CROSS-REFERENCE TO RELATED APPLICATIONS

This application is a National Stage entry under § 371 of International Application No. PCT/EP2017/083038, filed on Dec. 15, 2017, and which claims the benefit of European Application No. 16205042.1, filed on Dec. 19, 2016.

The present invention is directed to selected comb polymers comprising specified amounts of macromonomer and nitrogen-containing (meth)acrylates, their preparation, lubricant compositions comprising such comb polymers and their use as solubilizers in lubricant compositions, especially in engine oil (EO) compositions.

Automotive industries have strong interest in fuel economy. To enhance fuel economy, engine oils need to employ effective friction modifiers (FM). Molybdenum dithiocarbamate (MoDTC) is a commonly used FM and superior in friction reduction performance compared to other FM, especially in boundary lubrication regime.

The purpose of a lubricant is to reduce the amount of friction between two surfaces. In some cases, the base oil of a lubricant may not have enough lubricity to perform this function sufficiently. In this situation, friction modifiers are added to increase the oil's lubricity. Friction modifiers are used to modify a lubricant's coefficient of friction. They are designed to change the amount of energy needed to cause two surfaces to move past one another.

The vast majority of friction modifiers in use today are designed to reduce friction or increase lubricity for better fuel economy. One way to achieve this goal would be to reduce the viscosity of the engine oils in use. The challenge is lowering the viscosity while maintaining a sufficient lubricant film to reduce wear and friction.

Friction modifiers are most efficient under boundary conditions or where metal-to-metal contact occurs. Organic friction modifiers have long, soluble chains and a polar head. The polar head attaches to the metal surfaces. The soluble chains line up beside each other much like fibers in a carpet. The polar heads may be comprised of phosphoric or phosphonic acids, amines, amides or carboxylic acids. The soluble chains form dense mono layers or thick, reacted viscous layers. These layers shear easily and create a relatively slippery surface.

Mechanical types of friction modifiers form layers of platelets that align with one another, providing a reduction in friction. The most common of these is molybdenum dithiocarbamate (MoDTC). These additives reduce friction by forming nano-sized single sheets dispersed in either a carbon or pyrite matrix. These nano-sized sheets are oriented in layers and slide against one another, reducing the generated friction.

As fuel economy standards become more stringent, more will be required of engine oils. While the technology for friction modifiers continues to evolve, the most effective way to improve fuel economy or energy consumption is to lower the viscosity of the lubricant. However, you can only go so far before losing the hydrodynamic film and operating in either mixed-film lubrication or boundary lubrication. It is in these two lubrication regimes that the use of friction modifiers becomes critical for reducing friction.

To design fuel economy engine oils, the reduction of friction at hydrodynamic lubrication and mixed and boundary lubrication is very important. MoDTC is well-known as friction modifier which reduces friction at boundary lubrication, but the solubility of MoDTC in API Group III or Group III+ base oil is not so good. On the other hand, comb type viscosity index improvers can increase the viscosity index (VI) of a lubricating oil. Which means that it can reduce hydrodynamic friction at 40° C. while keeping viscosity at high temperature. However, dosage of MoDTC was limited due to solubility. The use of dispersant comb helps to increase the solubility of MoDTC in Group III+ base oils and to provide low friction coefficient and low $KV_{40}$.

Molybdenum dithiocarbamates are well-known additives for lubrication formulation. Molybdenum dialkyldithiocarbamates prepared from symmetrical dialkylamines and mixtures of symmetrical dialkylamines are currently used as additives in lubricating oils (as well as mixtures thereof) for imparting antifriction properties (see U.S. Pat. No. 7,763,744 B2). The drawback of molybdenum dialkyldithiocarbamates is that they do not have the desired solubility, especially at lower temperatures, so that the compound separates from the lubricating composition, resulting in the formation of a haze, cloud or precipitate in the lubricating composition, thus reducing its effectiveness.

Therefore, there is a desire for lubricating compositions which offer an improved solubility of molybdenum dialkyldithiocarbamate friction modifiers with in lubricating compositions.

It was now surprisingly found that novel polyalkyl(meth)acrylate based comb polymers are able to increase the solubility of molybdenum in lubricating compositions.

The comb polymer technology in general and their use as viscosity index improver is already known (US 2008/0194443, US 2010/0190671 and WO 2014/170169), although an effect of these compounds on the solubility of molybdenum in lubricating formulations has never been described.

Lubricant properties are typically improved by the addition of additives to lubricating oils.

U.S. Pat. Nos. 5,565,130 and 5,597,871, for example, disclose using comb polymers comprising polybutadiene-derived macromonomers as viscosity index improvers. However, an effect of such comb polymers on the solubility of molybdenum in lubricating formulations is not disclosed therein. WO 2007/003238 A1 describes oil-soluble comb polymers based on polyolefin-based macromonomers, especially polybutadiene-based methacrylic esters, and C1-C10 alkyl methacrylates. The comb polymers can be used as an additive for lubricant oils, in order to improve the viscosity index and shear stability. However, an effect of such comb polymers on the solubility of molybdenum in lubricating formulations is not disclosed therein.

WO 2009/007147 A1 discloses the use of comb polymers based on polyolefin-based macromonomers, especially polybutadiene-based methacrylic esters, and C1-C10 alkyl methacrylates for improving the fuel consumption of motor vehicles. However, an effect of such comb polymers on the solubility of molybdenum in lubricating formulations is not disclosed therein.

WO 2010/102903 A1 discloses the use of dispersant comb polymers as antifatigue additives for transmission, motor and hydraulic oils. However, an effect of such dispersant comb polymers on the solubility of molybdenum in lubricating formulations is not disclosed therein.

DE 10 2009 001 447 A1 describes the use of comb polymers for improving the load-bearing capacity of hydraulic oils having a high viscosity index. However, an effect of such comb polymers on the solubility of molybdenum in lubricating formulations is not disclosed therein.

WO 2012/025901 A1 (Total) discloses the use of comb polymers in lubricants in combination with particular friction modifiers. However, an effect of such comb polymers on the solubility of molybdenum in lubricating formulations is not disclosed therein.

The prior art generally focused on non-dispersant comb polymers to reduce fuel consumption in terms of hydrodynamic lubrication. This present invention improves the friction for mixed and boundary lubrication while keeping a long term storage stability, especially at low temperatures.

DETAILED DESCRIPTION OF THE INVENTION

A first object of the present invention is directed to polyalkyl(meth)acrylate based comb polymers, comprising the following monomers:
(a) 10 to 20% by weight of esters of (meth)acrylic acid and a hydroxylated hydrogenated polybutadiene; and
(b) 0.5% to 5% by weight, preferably 0.5 to 3% by weight, of a nitrogen-containing (meth)acrylate selected from the group consisting of aminoalkyl (meth)acrylates, aminoalkyl(meth)acrylamides and mixtures thereof.

A preferred first embodiment is directed to the polyalkyl (meth)acrylate based comb polymers, comprising the following monomers:
(a) 10 to 20% by weight of an ester of (meth)acrylic acid and a hydroxylated hydrogenated polybutadiene;
(b) 0% to 1% by weight of methyl methacrylate;
(c) 60% to 75% by weight of n-butyl methacrylate;
(d) 10% to 20% by weight of $C_{10-30}$ alkyl (meth)acrylates, preferably $C_{10-15}$ alkyl methacrylates, more preferably $C_{12-14}$ alkyl methacrylates;
(e) 0% to 1% by weight of styrene monomers; and
(f) 0.5 to 3% by weight of a nitrogen-containing (meth) acrylate selected from the group consisting of aminoalkyl (meth)acrylates, aminoalkyl(meth)acrylamides and mixtures thereof, preferably N,N-dimethylaminoethyl methacrylate and N,N-dimethylaminopropyl methacrylamide.

A further preferred first embodiment is directed to the polyalkyl(meth)acrylate based comb polymers, comprising the following monomers:
(a) 14 to 16% by weight of an ester of (meth)acrylic acid and a hydroxylated hydrogenated polybutadiene;
(b) 0% to 1% by weight of methyl methacrylate;
(c) 65% to 70% by weight of n-butyl methacrylate;
(d) 14% to 17% by weight of $C_{10-15}$ alkyl methacrylates, preferably $C_{12-14}$ alkyl methacrylates;
(e) 0% to 1% by weight of styrene monomers; and
(f) 0.5 to 3% by weight of a nitrogen-containing (meth) acrylate selected from the group consisting of N,N-dimethylaminoethyl methacrylate and N,N-dimethylaminopropyl methacrylamide.

The content of each component (a), (b), (c), (d), (e) and (f) is based on the total composition of the polyalkyl(meth) acrylate based comb polymer.

In a particular embodiment, the proportions of components (a) to (f) add up to 100% by weight.

The weight-average molecular weight $M_w$ of the polyalkyl(meth)acrylate based copolymers according to the present invention is preferably in the range of 200,000 to 500,000 g/mol, and more preferably in the range of 300,000 to 400,000 g/mol.

Preferably, the polyalkyl(meth)acrylate based comb polymers according to the present invention have a polydipersity index (PDI) $M_w/M_n$ in the range of 1 to 6, more preferably in the range of 3 to 5.

$M_w$ and $M_n$ are determined by gel permeation chromatography (GPC) with RI detector in tetrahydrofuran at 40° C. using a polymethyl methacrylate (PMMA) calibration.

A comb polymer in the context of this invention comprises a first polymer, which is also referred to as backbone or main chain, and a multitude of further polymers which are referred to as side chains and are bonded covalently to the backbone. In the present case, the backbone of the comb polymer is formed by the interlinked unsaturated groups of the mentioned (meth)acrylates. The ester groups of the (meth)acrylic esters, the phenyl radicals of the styrene monomers and the substituents of the further free-radically polymerizable comonomers form the side chains of the comb polymer.

The term "acrylate" refers to esters of acrylic acid; the term "methacrylate" refers to esters of methacrylic acid; and the term "(meth)acrylate" refers to both, esters of acrylic acid and esters methacrylic acid.

The hydroxylated hydrogenated polybutadiene for use in accordance with the invention has a number-average molar mass $M_n$ of 4,000 to 6,000 g/mol, preferably 4,000 to 5,000 g/mol. Because of their high molar mass, the hydroxylated hydrogenated polybutadienes can also be referred to as macroalcohols in the context of this invention.

The number-average molar mass $M_n$ is determined by size exclusion chromatography using commercially available polybutadiene standards. The determination is effected to DIN 55672-1 by gel permeation chromatography with THF as eluent.

Preferably, the hydroxylated hydrogenated polybutadiene has a hydrogenation level of at least 99%. An alternative measure of the hydrogenation level which can be determined on the copolymer of the invention is the iodine number. The iodine number refers to the number of grams of iodine which can be added onto 100 g of copolymer. Preferably, the copolymer of the invention has an iodine number of not more than 5 g of iodine per 100 g of copolymer. The iodine number is determined by the Wijs method according to DIN 53241-1:1995-05.

Preferred hydroxylated hydrogenated polybutadienes can be obtained according to GB 2270317.

Some hydroxylated hydrogenated polybutadienes are also commercially available. The commercially hydroxylated hydrogenated polybutadienes include, for example, Kraton Liquid® L-1203, a hydrogenated polybutadiene OH-functionalized to an extent of about 98% by weight (also called olefin copolymer OCP) having about 50% each of 1,2 repeat units and 1,4 repeat units, of $M_n$=4200 g/mol, from Kraton Polymers GmbH (Eschborn, Germany). A further supplier of suitable alcohols based on hydrogenated polybutadiene is Cray Valley (Paris), a daughter company of Total (Paris), or the Sartomer Company (Exton, Pa., USA).

Preference is given to monohydroxylated hydrogenated polybutadienes. More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with ethylene oxide or propylene oxide, a hydroxy-functionalized polybutadiene can be prepared. This hydroxylated polybutadiene can be hydrogenated in the presence of a suitable transition metal catalyst.

The esters of (meth)acrylic acid for use in accordance with the invention and a hydroxylated hydrogenated polybutadiene described are also referred to as macromonomers in the context of this invention because of their high molar mass.

The macromonomers for use in accordance with the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate (Ti(OiPr)$_4$) or dioctyltin oxide (Sn(OCt)$_2$O). The reaction is an equilibrium reaction. Therefore, the low molecular weight alcohol released is typically removed, for example by distillation.

In addition, the macromonomers can be obtained by a direct esterification proceeding, for example, from (meth)acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

Some of the macromonomers for use in accordance with the invention are also commercially available, for example Kraton Liquid® L-1253 which is produced from Kraton Liquid® L-1203 and is a hydrogenated polybutadiene methacrylate-functionalized to an extent of about 96% by weight, having about 50% each of 1,2 repeat units and 1,4 repeat units, from Kraton Polymers GmbH (Eschborn, Germany). Kraton® L-1253 is likewise synthesized according to GB 2270317.

The $C_{10-30}$ alkyl (meth)acrylates for use in accordance with the invention are esters of (meth)acrylic acid and straight chain or branched alcohols having 10 to 30 carbon atoms. The term "$C_{10-30}$ alkyl methacrylates" encompasses individual (meth)acrylic esters with an alcohol of a particular length, and likewise mixtures of (meth)acrylic esters with alcohols of different lengths.

Suitable $C_{10-30}$ alkyl (meth)acrylates include, for example, 2-butyloctyl (meth)acrylate, 2-hexyloctyl (meth)acrylate, decyl (meth)acrylate, 2-butyldecyl (meth)acrylate, 2-hexyldecyl (meth)acrylate, 2-octyldecyl (meth)acrylate, undecyl (meth)acrylate, 2-methylundecyl (meth)acrylate, dodecyl (meth)acrylate, 2-methyldodecyl (meth)acrylate, 2-hexyldodecyl (meth)acrylate, 2-octyldodecyl (meth)acrylate, tridecyl (meth)acrylate, 2-methyltridecyl (meth)acrylate, tetradecyl (meth)acrylate, 2-decyltetradecyl (meth)acrylate, pentadecyl (meth)acrylate, hexadecyl (meth)acrylate, 2-methylhexadecyl (meth)acrylate, 2-dodecylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, 2-decyloctadecyl (meth)acrylate, 2-tetradecyloctadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate. 2-decyl-tetradecyl (meth)acrylate, 2-decyloctadecyl (meth)acrylate, 2-dodecyl-1-hexadecyl (meth)acrylate, 1,2-octyl-1-dodecyl (meth)acrylate, 2-tetradecylocadecyl (meth)acrylate, 1,2-tetradecyl-octadecyl (meth)acrylate and 2-hexadecyl-eicosyl (meth)acrylate.

The $C_{10-15}$ alkyl methacrylates for use in accordance with the invention are esters of methacrylic acid and alcohols having 10 to 15 carbon atoms. The term "$C_{10-15}$ alkyl methacrylates" encompasses individual methacrylic esters with an alcohol of a particular length, and likewise mixtures of methacrylic esters with alcohols of different lengths.

The suitable $C_{10-15}$ alkyl methacrylates include, for example, decyl methacrylate, undecyl methacrylate, 2-methylundecyl methacrylate, dodecyl methacrylate, 2-methyldodecyl methacrylate, tridecyl methacrylate, 2-methyltridecyl methacrylate, tetradecyl methacrylate and/or pentadecyl methacrylate.

Particularly preferred $C_{10-15}$ alkyl methacrylates are methacrylic esters of a linear $C_{12-14}$ alcohol mixture ($C_{12-14}$ alkyl methacrylate).

The aminoalkyl (meth)acrylates are preferably selected from the group consisting of N,N-dimethylaminoethyl (meth)acrylate, N,N-dimethylaminopropyl (meth)acrylate, N,N-diethylaminopentyl (meth)acrylate and N,N-dibutylaminohexadecyl (meth)acrylate.

Preferred aminoalkyl(meth)acrylamides are N,N-dimethylaminopropyl (meth)acrylamide.

The copolymer for use in accordance with the invention can be characterized on the basis of its molar degree of branching ("f-branch"). The molar degree of branching refers to the percentage in mol % of macromonomers (component (A)) used, based on the total molar amount of all the monomers in the monomer composition. The molar amount of the macromonomers used is calculated on the basis of the number-average molar mass $M_n$ of the macromonomers. The calculation of the molar degree of branching is described in detail in WO 2007/003238 A1, especially on pages 13 and 14, to which reference is made here explicitly.

The polyalkyl(meth)acrylate based comb polymers in accordance with the invention preferably have a molar degree of branching $f_{branch}$ of 0.1 to 5 mol %, more preferably 0.3 to 2 mol % and most preferably 0.3 to 1.1 mol %.

The polyalkyl(meth)acrylate based comb polymers in accordance with the invention can be prepared by free-radical polymerization and by related methods of controlled free-radical polymerization, for example ATRP (=atom transfer radical polymerization) or RAFT (=reversible addition fragmentation chain transfer).

Standard free-radical polymerization is detailed, inter alia, in Ullmann's Encyclopedia of Industrial Chemistry, Sixth Edition. In general, a polymerization initiator and optionally a chain transfer agent are used for this purpose.

The usable initiators include azo initiators widely known in the technical field, such as AIBN and 1,1-azobiscyclohexanecarbonitrile, and also peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis (2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the aforementioned compounds with one another, and mixtures of the aforementioned compounds with unspecified compounds which can likewise form free radicals. Suitable chain transfer agents are especially oil-soluble mercaptans, for example n-dodecyl mercaptan or 2-mercaptoethanol, or else chain transfer agents from the class of the terpenes, for example terpinolene.

The ATRP method is known in the art. It is assumed that this is a "living" free-radical polymerization, but no restriction is intended by the description of the mechanism. In these processes, a transition metal compound is reacted with a compound having a transferable atom group. This involves transfer of the transferable atom group to the transition metal compound, as a result of which the metal is oxidized. This reaction forms a free radical which adds onto ethylenic groups. However, the transfer of the atom group to the transition metal compound is reversible, and so the atom group is transferred back to the growing polymer chain, which results in formation of a controlled polymerization system. It is accordingly possible to control the formation of the polymer, the molecular weight and the molecular weight distribution.

This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP. In addition, the polymers of the invention can also be obtained via RAFT methods, for example. This method is described in detail, for example, in WO 98/01478 and WO 2004/083169.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

The polymerization can be conducted with or without solvent. The term "solvent" should be understood here in a broad sense. The solvent is selected according to the polarity of the monomers used, it being possible with preference to use 100N oil, comparatively light gas oil and/or aromatic hydrocarbons, for example toluene or xylene.

The polymers according to the present invention are characterized by their contribution to the solubility of (organic) molybdenum in lubricating oil compositions.

The present invention therefore also relates to the use of the above-described polyalkyl(meth)acrylate based comb polymers as solubilizer for (organic) molybdenum in lubricating oil compositions.

They are especially used to increase the solubility (and therefore the concentration) of molybdenum in lubricating oil compositions.

The present invention further relates to a method of increasing the solubility of molybdenum in lubricating compositions, especially in engine oil compositions, by adding the above-described polyalkyl(meth)acrylate based comb polymers.

By using the polyalkyl(meth)acrylate based comb polymers according to the present invention, the solubility of molybdenum in lubricating oil compositions can be increased by up to 0.2% by weight, based on the total weight of the lubricating oil composition.

Accordingly, by using a polyalkyl(meth)acrylate based comb polymers according to the present invention, 0.5 to 5% by weight, preferably 0.5 to 2% by weight, more preferably 1 to 2% by weight, based on the total weight of the lubricating oil composition, of molybdenum dithiocarbamate can be dissolved which deliver 0.05 to 0.5% by weight, preferably 0.05 to 0.2% by weight, and more preferably 0.1 to 0.2% by weight of molybdenum to the lubricating oil composition.

A second object of the present invention is directed to an additive composition, comprising:
(A) a base oil, and
(B) a polyalkyl(meth)acrylate based comb polymer, comprising the following monomers:
  (a) 10 to 20% by weight of esters of (meth)acrylic acid and a hydroxylated hydrogenated polybutadiene; and
  (b) 0.5% to 5% by weight of a nitrogen-containing (meth)acrylate selected from the group consisting of aminoalkyl (meth)acrylates, aminoalkyl(meth)acrylamides and mixtures thereof.

A preferred second object is directed to an additive composition, comprising:
(A) a base oil; and
(B) a polyalkyl(meth)acrylate based comb polymer, comprising the following monomers:
  (a) 10 to 20% by weight of an ester of (meth)acrylic acid and a hydroxylated hydrogenated polybutadiene;
  (b) 0% to 1% by weight of methyl methacrylate;
  (c) 60% to 75% by weight of n-butyl methacrylate;
  (d) 10% to 20% by weight of $C_{10\text{-}30}$ alkyl (meth)acrylates, preferably $C_{10\text{-}15}$ alkyl methacrylates, more preferably $C_{12\text{-}14}$ alkyl methacrylates;
  (e) 0% to 1% by weight of styrene monomers; and
  (f) 0.5 to 3% by weight of a nitrogen-containing (meth)acrylate selected from the group consisting of aminoalkyl (meth)acrylates, aminoalkyl(meth)acrylamides and mixtures thereof, preferably N,N-dimethylaminoethyl methacrylate and N,N-dimethylaminopropyl methacrylamide.

A further preferred second object is directed to an additive composition, comprising:
(A) a base oil; and
(B) a polyalkyl(meth)acrylate based comb polymer, comprising the following monomers:
  (a) 14 to 16% by weight of an ester of (meth)acrylic acid and a hydroxylated hydrogenated polybutadiene;
  (b) 0% to 1% by weight of methyl methacrylate;
  (c) 65% to 70% by weight of n-butyl methacrylate;
  (d) 14% to 17% by weight of $C_{10\text{-}15}$ alkyl methacrylates, preferably $C_{12\text{-}14}$ alkyl methacrylates;
  (e) 0% to 1% by weight of styrene monomers; and
  (f) 0.5 to 3% by weight of a nitrogen-containing (meth)acrylate selected from the group consisting of aminoalkyl (meth)acrylates, aminoalkyl(meth)acrylamides and mixtures thereof, preferably N,N-dimethylaminoethyl methacrylate and N,N-dimethylaminopropyl methacrylamide.

The content of each component (A) and (B) is based on the total weight of the additive composition.

In a particular embodiment, the proportions of components (A) and (B) add up to 100% by weight.

The content of each component (a), (b), (c), (d), (e) and (f) is based on the total composition of the polyalkyl(meth) acrylate based comb polymer.

In a particular embodiment, the proportions of components (a), (b), (c), (d), (e) and (f) add up to 100% by weight.

The base oil to be used in the additive composition and in the lubricating oil composition comprises an oil of lubricating viscosity. Such oils include natural and synthetic oils, oil derived from hydrocracking, hydrogenation, and hydrofinishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{10}$) of appropriate apolar base oils used to prepare an additive composition or lubricating composition in accordance with the present invention is preferably in the range of 1 mm²/s to 10 mm²/s, more preferably in the range of 2 mm²/s to 8 mm²/s, according to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for engine oil formulations are used base oils of API Group III and mixtures of different Group III oils.

The additive composition of the present invention comprises preferably 60% to 80% by weight, more preferably 70% to 75%, by weight, of base oil (component (A)), based on the total weight of the additive composition.

The concentration of the polyalkyl(meth)acrylate based comb polymer (component (B)) in the additive composition is preferably in the range from 20% to 40% by weight, more preferably in the range of 25% to 30% by weight, based on the total weight of the additive composition.

In a particular embodiment, the proportions of components (A) and (B) add up to 100% by weight.

A third object of the present invention is directed to a lubricating oil composition, comprising:
(A) 85 to 99% by weight of a base oil;
(B) 0.5 to 10% by weight of a polyalkyl(meth)acrylate based comb polymer, comprising the following monomers:
  (a) 10 to 20% by weight of esters of (meth)acrylic acid and a hydroxylated hydrogenated polybutadiene; and
  (b) 0.5% to 5% by weight of a nitrogen-containing (meth)acrylate selected from the group consisting of aminoalkyl (meth)acrylates, aminoalkyl(meth)acrylamides and mixtures thereof, preferably N,N-dimethylaminoethyl methacrylate and N,N-dimethylaminopropyl methacrylamide;
(C) 0.5 to 5% by weight of molybdenum-containing friction modifier delivering 0.05 to 0.5% by weight of molybdenum; and
(D) optionally one or more further additives.

A preferred third object of the present invention is directed to a lubricating oil composition, comprising:
(A) 85 to 99% by weight of a base oil;
(B) 0.5 to 10% by weight of a polyalkyl(meth)acrylate based comb polymer, comprising the following monomers:
  (a) 10 to 20% by weight of an ester of (meth)acrylic acid and a hydroxylated hydrogenated polybutadiene;
  (b) 0% to 1% by weight of methyl methacrylate;
  (c) 60% to 75% by weight of n-butyl methacrylate;
  (d) 10% to 20% by weight of $C_{10-30}$ alkyl (meth)acrylates, preferably $C_{10-15}$ alkyl methacrylates, more preferably $C_{12-14}$ alkyl methacrylates;
  (e) 0% to 1% by weight of styrene monomers; and
  (f) 0.5 to 3% by weight of a nitrogen-containing (meth)acrylate selected from the group consisting of aminoalkyl (meth)acrylates, aminoalkyl(meth)acrylamides and mixtures thereof, preferably N,N-dimethylaminoethyl methacrylate and N,N-dimethylaminopropyl methacrylamide;
(C) 0.5 to 5% by weight of molybdenum-containing friction modifier delivering 0.05 to 0.5% by weight of molybdenum; and
(D) optionally one or more further additives.

A further preferred third object of the present invention is directed to a lubricating oil composition, comprising:
(A) 85 to 99% by weight of a base oil;
(B) 0.5 to 10% by weight of a polyalkyl(meth)acrylate based comb polymer, comprising the following monomers:
  (a) 14 to 16% by weight of an ester of (meth)acrylic acid and a hydroxylated hydrogenated polybutadiene;
  (b) 0% to 1% by weight of methyl methacrylate;
  (c) 65% to 70% by weight of n-butyl methacrylate;
  (d) 14% to 17% by weight of $C_{10-15}$ alkyl methacrylates, preferably $C_{12-14}$ alkyl methacrylates;
  (e) 0% to 1% by weight of styrene monomers; and
  (f) 0.5 to 3% by weight of a nitrogen-containing (meth)acrylate selected from the group consisting of aminoalkyl (meth)acrylates, aminoalkyl(meth)acrylamides and mixtures thereof, preferably N,N-dimethylaminoethyl methacrylate and N,N-dimethylaminopropyl methacrylamide;

(C) 0.5 to 5% by weight of molybdenum-containing friction modifier delivering 0.05 to 0.5% by weight of molybdenum; and (D) optionally one or more further additives.

The content of each component (A), (B), (C) and (D) is based on the total weight of the lubricating oil composition.

In a particular embodiment, the proportions of components (A) to (D) add up to 100% by weight.

The content of each component (a), (b), (c), (d), (e) and (f) is based on the total composition of the polyalkyl(meth)acrylate based comb polymer.

In a particular embodiment, the proportions of components (a), (b), (c), (d), (e) and (f) add up to 100% by weight.

The lubricating oil composition of the present invention comprises preferably 88 to 94.5% by weight of a base oil (component (A)), based on the total weight of the lubricating oil composition.

The concentration of the polyalkyl(meth)acrylate based comb polymer (component (B)) in the lubricating oil composition is preferably in the range of 5 to 10% by weight, based on the total weight of the lubricating oil composition.

The concentration of the molybdenum-containing friction modifier is preferably 0.5 to 2% by weight and more preferably 1 to 2% by weight. Accordingly, the amount of molybdenum which is delivered is preferably in the range of 0.05 to 0.2% by weight and more preferably in the range of 0.1 to 0.2% by weight, based on the total weight of the lubricating oil composition.

Further preferred contents of components (A), (B), (C) and (D) in the lubricating oil compositions according to the present invention are as detailed in the following table:

| Lubricating Oil Composition | Component (A) [% by weight] | Component (B) [% by weight] | Component (C) [% by weight] |
|---|---|---|---|
| (1a) | 88 to 99 | 0.5 to 10 | 0.5 to 2 |
| (2a) | 88 to 98.5 | 0.5 to 10 | 1 to 2 |
| (3a) | 85 to 94.5 | 5 to 10 | 0.5 to 5 |
| (4a) | 88 to 94.5 | 5 to 10 | 0.5 to 2 |
| (5a) | 88 to 94 | 5 to 10 | 1 to 2 |

| Lubricating Oil Composition | Component (A) [% by weight] | Component (B) [% by weight] | Component (C) [% by weight] | Component (D) [% by weight] |
|---|---|---|---|---|
| (1b) | 70 to 99 | 0.5 to 10 | 0.5 to 5 | 0 to 15 |
| (2b) | 73 to 99 | 0.5 to 10 | 0.5 to 2 | 0 to 15 |
| (3b) | 73 to 98.5 | 0.5 to 10 | 1 to 2 | 0 to 15 |
| (4b) | 70 to 94.5 | 5 to 10 | 0.5 to 5 | 0 to 15 |
| (5b) | 73 to 94.5 | 5 to 10 | 0.5 to 2 | 0 to 15 |
| (6b) | 73 to 94 | 5 to 10 | 1 to 2 | 0 to 15 |

In a particular embodiment, the proportions of components (A), (B), (C) and (D) add up to 100% by weight.

As additives which may deliver molybdenum can be used commercially available molybdenum-containing friction modifiers, preferably molybdenum dithiocarbamates (MoDTCs).

Commercially available molybdenum dithiocarbamates are, for example, the MOLIVAN® series from R.T. Vanderbilt Company, Inc., New York. As an especially preferred example Molivan®3000 can be used which contains 10% of molybdenum.

The molybdenum-containing friction modifier may be present in a range of 0.5 to 5% by weight, preferably 0.5 to 2% by weight, more preferably 1 to 2% by weight, based on the total weight of the lubricating oil composition, and delivers 0.05 to 0.5% by weight, preferably 0.05 to 0.2% by weight, and more preferably 0.1 to 0.2% by weight of molybdenum.

The lubricating oil compositions according to the present invention are characterized by their low friction coefficient. They are especially characterized by a friction coefficient below 0.1, preferably between 0.05 and 0.1 (measured after 30 minutes).

The lubricating oil compositions according to the present invention are further characterized by their low $KV_{40}$ values. The $KV_{40}$ is preferably below 25 mm$^2$/s, more preferably between 18 and 22 mm$^2$/s, even more preferred around 20 mm$^2$/s, i.e. 20±1 mm$^2$/s (when formulated to a given $KV_{80}$ of 7 mm$^2$/s).

Preferred lubricating oil compositions are characterized by a friction coefficient between 0.05 and 0.1 (measured after 30 minutes) and a $KV_{40}$ of below 25 mm$^2$/s, preferably between 18 and 22 mm$^2$/s and more preferably of 20±1 mm$^2$/s.

The lubricating oil composition according to the invention may also contain, as component (D), further additives selected from the group consisting of conventional VI improvers, dispersants, defoamers, detergents, antioxidants, pour point depressants, antiwear additives, extreme pressure additives, anticorrosion additives, dyes and mixtures thereof.

Conventional VI improvers include hydrogenated styrene-diene copolymers (HSDs, U.S. Pat. Nos. 4,116,917, 3,772,196 and 4,788,316), especially based on butadiene and isoprene, and also olefin copolymers (OCPs, K. Marsden: "Literature Review of OCP Viscosity Modifiers", Lubrication Science 1 (1988), 265), especially of the poly (ethylene-co-propylene) type, which may often also be present in N/O-functional form with dispersing action, or PAMAs, which are usually present in N-functional form with advantageous additive properties (boosters) as dispersants, wear protection additives and/or friction modifiers (DE 1 520 696 to Röhm and Haas, WO 2006/007934 to RohMax Additives).

Compilations of VI improvers and pour point improvers for lubricant oils, especially motor oils, are detailed, for example, in T. Mang, W. Dresel (eds.): "Lubricants and Lubrication", Wiley-VCH, Weinheim 2001: R. M. Mortier, S. T. Orszulik (eds.): "Chemistry and Technology of Lubricants", Blackie Academic & Professional, London 1992; or J. Bartz: "Additive für Schmierstoffe", Expert-Verlag, Renningen-Malmsheim 1994.

Appropriate dispersants include poly(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricating oil composition.

Suitable defoamers are silicone oils, fluorosilicone oils, fluoroalkyl ethers, etc.

The defoaming agent is preferably used in an amount of 0.005 to 0.1% by weight, based on the total amount of the lubricating oil composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricating oil composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyl-4-(N,N'-dimethylaminomethylphenol); 4,4'thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl) propionate], etc. Of those, especially preferred are bis-phenol-based antioxidants and ester group containing phenol-based antioxidants. The amine-based antioxidants include, for example, monoalkyldiphenylamines such as monooctyldiphenylamine, mononyldiphenylamine, etc.; dialkyldiphenylamines such as 4,4'-dibutyldiphenylamine, 4,4'-dipentyldiphe nylamine, 4,4'-dihexyldiphenylamine, 4,4'-diheptyldiphenylamine, 4,4'-dioctyldiphenylamine, 4,4'-dinonyldiphenylamine, etc.; polyalkyldiphenylamines such as tetrabutyldiphenylamine, tetrahexyldiphenylamine, tetraoctyldiphenylamine, tetranonyldiphenylamine, etc.; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organo-phosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.5 to 5% by weight, based on the total amount of the lubricating oil composition.

The pour-point depressants include ethylene-vinyl acetate copolymers, chlorinated paraffin-naphthalene condensates, chlorinated paraffin-phenol condensates, polymethacrylates, polyalkylstyrenes, etc. Preferred are polymethacrylates having a mass-average molecular weight of from 5,000 to 200,000 g/mol.

The amount of the pour point depressant is preferably from 0.1 to 5% by weight, based on the total amount of the lubricating oil composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc.; sulfur and phosphorus-containing anti-wear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.5 to 0.9% by weight, based on the total amount of the lubricating oil composition.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferably, the total concentration of the one or more additives (D) is 0 to 15% by weight, more preferably 0.05% to 15% by weight, more preferably 3% to 10% by weight, based on the total weight of the lubricating oil composition.

The invention has been illustrated by the following non-limiting examples.

Experimental Part

Abbreviations

AMA $C_{12-14}$ alkyl methacrylate
BMA n-butyl methacrylate
DMAEMA N,N-dimethylaminoethyl methacrylate
DMAPMAm N,N-dimethylaminopropyl methacrylamide
Hydroseal
G232H base oil from Total with a $KV_{100}$ of 1 cSt
LMA lauryl methacrylate, 73% C12, 27% C14, all linear
$KV_{40}$ kinematic viscosity @40° C., measured according to ASTM D7042
$KV_{80}$ kinematic viscosity @80° C., measured according to ASTM D7042
$KV_{100}$ kinematic viscosity @100° C., measured according to ASTM D7042
$M_n$ number-average molecular weight
$M_w$ weight-average molecular weight
MMA methyl methacrylate
Molyvan®3000 Molybdenum content is 10.1% by weight
NB3020 Nexbase® 3020, Group III base oil from Neste with a $KV_{100}$ of 2.2 cSt NB3043 Nexbase® 3043, Group III base oil from Neste with a $KV_{100}$ of 4.3 cSt
PDI Polydispersity index
Shell Risella
X420 Group III base oil from Shell, $KV_{100}$=4.1 cSt, $KV_{40}$=18.2 cSt, VI=131, density=0.808 g/cm$^3$
tBPO tert-butyl peroctoate
VI viscosity index, measured according to ASTM D2270
Test Methods The comb polymers according to the present invention and the comparative examples were characterized with respect to their molecular weight and PDI.

The weight average and number average molecular weights were determined by GPC with RI detector in tetrahydrofuran at 40° C. using a polymethyl methacrylate calibration. A combination of PSS-SDV Linear XL 10 μ*2 and PSS-SDV 100A columns was used. Flow rate is 1 ml/min. Injection volume is 100 μL.

The lubricating oil compositions including the comb polymers according to the present invention and comparative examples were characterized with respect to kinematic viscosity at 40° C. ($KV_{40}$), 80° C. ($KV_{80}$)) and 100° C. ($KV_{100}$) to ASTM D445, the viscosity index (VI) to ASTM D 2270, low temperature storage test was performed at –20° C. for 1 week and the appearance was observed by visual. The friction coefficient was measured according to ASTM D6425 (load: 400 N, Oscillation=3 mm*50 Hz, Temperature is 80° C., Cylinder on disc, Steel cylinder=φ15*22 mm, Steel disc=φ24*7.9 mm, Sample volume=100 μL) and values are reported after 30 and 60 minutes.

Synthesis of a Hydroxylated Hydrogenated Polybutadiene

The macroalcohol prepared was a hydroxypropyl-terminated hydrogenated polybutadiene having a mean molar mass $M_n$=4750 g/mol.

The macroalcohol was synthesized by an anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and pressure 200 bar. After the hydrogenation had ended, the noble metal catalyst was removed and organic solvent was drawn off under reduced pressure. Finally, the base oil NB3020 was used for dilution to a polymer content of 70% by weight.

The vinyl content of the macroalcohol was 61%, the hydrogenation level >99% and the OH-functionality >98%. These values were determined by $^1$H-NMR (nuclear resonance spectroscopy).

Synthesis of Macromonomer (MM)

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohol are dissolved in 450 g of methyl methacrylate (MMA) by stirring at 60° C. Added to the solution are 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 g of MMA are distilled off for azeotropic drying. After cooling to 95° C., 0.30 g of LiOCH$_3$ is added and the mixture is heated back to reflux. After the reaction time of about 1 hour, the top temperature has fallen to ~64° C. because of methanol formation. The methanol/MMA azeotrope formed is distilled off constantly until a constant top temperature of about 100° C. is established again. At this temperature, the mixture is left to react for a further hour. For further workup, the bulk of MMA is drawn off under reduced pressure. Insoluble catalyst residues are removed by pressure filtration (Seitz T1000 depth filter). The content of NB3020 "entrained" into the copolymer syntheses described further down was taken into account accordingly.

Preparation of Polymer A-C

In a beaker, the reaction mixture was made up according to Table 1. A 2 liter 4-neck round-bottom flask with saber stirrer, nitrogen blanketing, thermometer, heater, and reflux condenser was initially charged with 199.7 g of the reaction mixture and heated to 95° C. while stirring. During the heating phase, nitrogen was passed through the reaction flask for inertization. On attainment of 95° C., 0.20 g of tBPO was introduced into the reaction flask; at the same time, the feed consisting of the rest of the reaction mixture and 0.20 g of tBPO was started. The feed time was 3 hours; the reaction temperature was kept constant at 95° C. After the end of feed, it was held for 45 minutes. Then 101.1 g of NB3043 was fed over 180 minutes. 0.4 g of tBPO was charged into dilution feed oil of NB3043 in 75 minutes. In the end of feed, the batch was kept at 95° C. for 2 hours, and then 0.40 g of tBPO and 165.3 g of NB3043 were charged into the reaction flask. Next day, 133.1 g of NB3043 was charged into the reaction flask and held the batch for 1 hour. 800 g of a high-viscosity solution was obtained.

Preparation of Polymers D and E

Polymers D and E were prepared according to Examples 1 and 2 of WO 2010/102903, respectively (see pages 61 and 62, herein incorporated by reference).

TABLE 1

| | Polymer A | Polymer B | Polymer C | Polymer D | Polymer E |
|---|---|---|---|---|---|
| 70% Macromonomer solution in oil [g] | 42.8 | 42.8 | 42.8 | 90.0 | 94.3 |
| LMA [g] | 30.7 | 32.6 | 30.0 | — | — |
| AMA [g] | | | | 0.3 | 0.3 |
| BMA [g] | 136.8 | 132.4 | 139.0 | 12.6 | 12.6 |
| Styrene [g] | 0.4 | 0.4 | 0.4 | 68.7 | 65.7 |
| MMA [g] | 0.4 | 0.4 | 0.4 | 0.3 | 0.3 |
| DMAEMA [g] | 1.5 | — | — | 5.1 | — |
| DMAPMAm [g] | — | 4.0 | — | — | 5.1 |
| NB3043 [g] | 100.6 | 100.6 | 100.6 | — | — |
| Hydroseal G232H [g] | 86.2 | 86.2 | 86.2 | — | — |

The net compositions of the resulting comb polymers as well as their characteristic weight-average molecular weights $M_w$ and their polydispersity indices (PDI) are given in the following Table 2. If not otherwise specified, [%] means % by weight.

TABLE 2

Net compositions of the comb polymers prepared according to the present invention

|  | Example 1 | Example 2 | Example 3 (CE)[*] | Example 4 (CE)[*] | Example 5 (CE)[*] |
|---|---|---|---|---|---|
| Polymer | Polymer A | Polymer B | Polymer C | Polymer D | Polymer E |
| Macromonomer [%] | 15.0 | 15.0 | 15.0 | 42.0 | 44.0 |
| LMA [%] | 15.3 | 16.3 | 15.0 | 0.2 | 0.2 |
| MMA [%] | 0.2 | 0.2 | 0.2 | 0.2 | 0.2 |
| BMA [%] | 68.5 | 66.3 | 69.6 | 8.4 | 8.4 |
| Styrene [%] | 0.2 | 0.2 | 0.2 | 45.8 | 43.8 |
| DMAPMA [%] | — | 2.0 | — | — | 3.4 |
| DMAEMAm [%] | 0.8 | — | — | 3.4 | — |
| Total [%] | 100 | 100 | 100 | 100 | 100 |
| $M_w$ [g/mol] | 331.444 | 323.478 | 347.668 | 225.255 | 239.988 |
| $M_n$ [g/mol] | 84.735 | 73.791 | 86.096 | 55.663 | 48.418 |
| PDI | 3.91 | 4.38 | 4.04 | 4.05 | 4.96 |

[*] CE = comparative example

Examples 1 and 2 are in accordance with the present invention and comprise N-dispersant monomers within the defined ranges. Example 3 is a comparative example as it does not comprise any N-dispersant monomers. Examples 4 and 5 comprise N-dispersant monomers (DMAPMAm and DMAEMA) but higher amounts of macromonomer and lower amounts of butyl methacrylate than defined in the present invention.

To demonstrate the effect of the polyalkyl(methacrylate) based comb polymers according to the present invention on the solubility of molybdenum in lubricating oil compositions different formulation examples A were prepared and the corresponding viscosity data ($KV_{40}$, $KV_{80}$, $KV_{100}$, VI), stability (storage test) and friction coefficients were determined. The results are summarized in Table 3.

TABLE 3

Lubricating oil compositions A

|  | A1 | A2 | A3 | A4 | A5 | A6 (CE)[*] | A7 (CE)[*] | A8 (CE)[*] | A9 (CE)[*] |
|---|---|---|---|---|---|---|---|---|---|
| Polymer A [%] | 7.9 | — | — | — | — | — | — | — | — |
| Polymer B [%] | — | 8.4 | 7.9 | 7.9 | 7.8 | — | — | — | — |
| Polymer C [%] | — | — | — | — | — | — | 8.0 | 8.0 | 7.9 |
| Polymer D [%] | — | — | — | — | — | — | — | — | — |
| Polymer E [%] | — | — | — | — | — | — | — | — | — |
| Base Oil (Shell Risella X420) [%] | 91.1 | 91.1 | 91.1 | 90.6 | 90.2 | 99.0 | 91.8 | 91.5 | 91.1 |
| Molyvan ®3000 (MoDTC) [%] | 1.0 | 0.50 | 1.0 | 1.50 | 2.0 | 1.0 | 0.25 | 0.50 | 1.0 |
| Mo content [%] | 0.10 | 0.050 | 0.10 | 0.15 | 0.20 | 0.10 | 0.025 | 0.05 | 0.10 |
| Total [%] | 100 | 100 | 100 | 100 | 100 | 100 | 100 | 100 | 100 |
| $KV_{100}$ [mm²/s] | 4.89 | 4.88 | 4.86 | 4.88 | 4.92 | [] | 5.05 | 5.08 | [] |
| $KV_{80}$ [mm²/s] | 6.91 | 6.93 | 6.91 | 6.95 | 7.01 |  | 6.92 | 6.96 |  |
| $KV_{40}$ [mm²/s] | 20.04 | 20.10 | 20.14 | 20.23 | 20.42 |  | 19.68 | 19.77 |  |
| VI | 181 | 179 | 177 | 177 | 178 |  | 202 | 203 |  |
| Low temperature storage test (−20° C., 1 week) | No precipitation | No precipitation | No precipitation | No precipitation | No precipitation | Precipitation was observed | No precipitation | No precipitation | Precipitation was observed |
| SRV test @80° C. Friction coefficient @30 min | 0.067 | 0.157 | 0.072 | 0.073 | 0.067 | — | — | 0.155 | — |
| SRV test @80° C. Friction coefficient @60 min | 0.149 | 0.139 | 0.141 | 0.066 | 0.060 | — | — | 0.159 | — |

TABLE 3-continued

Lubricating oil compositions A

|  | A10 (CE)*) | A11 (CE)*) | A12 (CE)*) | A13 (CE)*) |
|---|---|---|---|---|
| Polymer A [%] | — | — | — | — |
| Polymer B [%] | — | — | — | — |
| Polymer C [%] | — | — | — | — |
| Polymer D [%] | 4.2 | 4.2 | — | — |
| Polymer E [%] | — | — | 4.0 | 3.9 |
| Base Oil (Shell Risella X420) [%] | 94.8 | 93.8 | 95.0 | 94.1 |
| Molyvan ®3000 (MoDTC) [%] | 1.0 | 2.0 | 1.0 | 2.0 |
| Mo content [%] | 0.10 | 0.20 | 0.10 | 0.20 |
| Total [%] | 100 | 100 | 100 | 100 |
| $KV_{100}$ [mm²/s] | 4.72 | 4.78 | 4.71 | 4.76 |
| $KV_{80}$ [mm²/s] | 6.98 | 7.03 | 6.93 | 7.0 |
| $KV_{40}$ [mm²/s] | 20.78 | 21.15 | 20.81 | 21.15 |
| VI | 154 | 155 | 153 | 153 |
| Low temperature storage test (−20° C., 1 week) | No precipitation, but appearance was hazy | Precipitation was observed | No precipitation, but appearance was hazy | Precipitation was observed |
| SRV test @80° C. Friction coefficient @30 min | 0.051 | — | 0.053 | — |
| SRV test @80° C. Friction coefficient @60 min | 0.139 | — | 0.149 | — |

*)CE = comparative example
**) Not applicable due to precipitation of MoDTC

Formulations A1 to A5 are according to the present invention as they contain a polyalkyl(meth)acrylate based comb polymer comprising a macromonomer and nitrogen-containing (meth)acrylates. Formulation A6 does not contain any polyalkyl(meth)acrylate based comb polymer; formulations A7 to A9 contain a polyalkyl(meth)acrylate based comb polymer, but no nitrogen-containing monomer. Formulations A10 to A13 contain a polyalkyl(meth)acrylate based comb polymer, but different amounts of macromonomer and butyl methacrylate than the claimed ranges.

As the test temperature of SRV is 80° C. the $KV_{80}$ of all formulations was adjusted to about 7 mm²/s in order to minimize the influence of viscosity on the corresponding friction coefficients.

Table 3 clearly shows that in formulations comprising a comb polymer in accordance with the present invention (Formulations A1 to A5) up to 2% of molybdenum dithiocarbamate (Molyvan®3000) can be dissolved (delivering up to 0.2% by weight of molybdenum); the storage tests did not reveal any haziness or precipitation. Molyvan®3000 comprises 10% by weight of molybdenum.

Formulation A6 which does not contain a comb polymer was not able to dissolve even 1% of molybdenum dithiocarbamate (Molyvan®3000); precipitation was observed.

When using a comb polymer without N-dispersant monomer, in corresponding formulations could be dissolved up to 0.5% of molybdenum dithiocarbamate (Molyvan®3000). When adding 1% of molybdenum dithiocarbamate (Molyvan®3000) precipitation was observed (Formulations A7 to A9).

When using comb polymers comprising N-dispersant monomers but different amounts of macromonomer and butyl methacrylate than the claimed ranges, in corresponding formulations can be dissolved 1% of molybdenum dithiocarbamate (Molyvan®3000) but there appears already haziness (Formulations A10 and A12). By adding 2% of molybdenum dithiocarbamate (Molyvan®3000) precipitation was observed (Formulations A11 and A13).

Additionally, only the compositions comprising a comb polymer in accordance with the present invention show significant long-term friction reduction (SRV test after 60 minutes): the friction coefficient can be reduced especially when 0.15 and 0.2% of molybdenum are added from 0.139 (Formulation A2 comprising 0.05% of molybdenum) to 0.066 (Formulation A4 comprising 0.15% of molybdenum) and 0.060 (Formulation A5 comprising 0.2% of molybdenum).

The invention claimed is:

1. A polyalkyl(meth)acrylate based comb polymer, consisting of the following monomers in polymerized form:
   (a) 10% to 20% by weight of an ester of (meth)acrylic acid and a hydroxylated hydrogenated polybutadiene;
   (b) 0% to 1% by weight of methyl methacrylate;
   (c) 60% to 75% by weight of n-butyl methacrylate;
   (d) 10% to 20% by weight of $C_{10-15}$ alkyl methacrylates;
   (e) 0% to 1% by weight of at least one styrene monomer; and
   (f) 0.5% to 3% by weight of at least one nitrogen-containing (meth)acrylate selected from the group consisting of aminoalkyl (meth)acrylates, aminoalkyl (meth)acrylamides, and mixtures thereof.

2. The polyalkyl(meth)acrylate based comb polymer according to claim 1, consisting of the following monomers in polymerized form:
   (a) 14% to 16% by weight of an ester of (meth)acrylic acid and a hydroxylated hydrogenated polybutadiene;
   (b) 0% to 1% by weight of methyl methacrylate;
   (c) 65% to 70% by weight of n-butyl methacrylate;
   (d) 14% to 17% by weight of $C_{10-15}$ alkyl methacrylates;
   (e) 0% to 1% by weight of at least one styrene monomer; and
   (f) 0.5% to 3% by weight of at least one nitrogen-containing (meth)acrylate selected from the group consisting of N,N-dimethylaminoethyl methacrylate and N,N-dimethylaminopropyl methacrylamide.

3. The polyalkyl(meth)acrylate based comb polymer according to claim 1, wherein a weight-average molecular weight Mw is in the range of 200,000 to 500,000 g/mol.

4. The polyalkyl(meth)acrylate based comb polymer according to claim 1, wherein the hydroxylated hydrogenated polybutadiene of component (a) has a number-average molecular weight Mn in the range of 4,000 to 6,000 g/mol.

5. The polyalkyl(meth)acrylate based comb polymer according to claim 1, wherein the nitrogen-containing (meth)acrylate is at least one selected from the group consisting of N,N-dimethylaminoethyl methacrylate, N,N-dimethylaminopropylmethacrylamide, and mixtures thereof.

6. An additive composition, comprising:
   (A) 60% to 80% by weight of a base oil; and
   (B) 20% to 40% by weight of a polyalkyl(meth)acrylate based comb polymer, consisting of the following monomers in polymerized form:
      (a) 10% to 20% by weight of an ester of (meth)acrylic acid and a hydroxylated hydrogenated polybutadiene;
      (b) 0% to 1% by weight of methyl methacrylate;
      (c) 60% to 75% by weight of n-butyl methacrylate;
      (d) 10% to 20% by weight of $C_{10-15}$ alkyl methacrylates;
      (e) 0% to 1% by weight of at least one styrene monomer; and
      (f) 0.5% to 3% by weight of at least one nitrogen-containing (meth)acrylate selected from the group consisting of aminoalkyl (meth)acrylates, aminoalkyl(meth)acrylamides and mixtures thereof.

7. The additive composition according to claim 6, the polyalkyl(meth)acrylate based comb polymer consisting of the following monomers in polymerized form:
   (a) 14% to 16% by weight of an ester of (meth)acrylic acid and a hydroxylated hydrogenated polybutadiene;
   (b) 0% to 1% by weight of methyl methacrylate;
   (c) 65% to 70% by weight of n-butyl methacrylate;
   (d) 14% to 17% by weight of $C_{10-15}$ alkyl methacrylates;
   (e) 0% to 1% by weight of at least one styrene monomer; and
   (f) 0.5% to 3% by weight of at least one nitrogen-containing (meth)acrylate selected from the group consisting of N,N-dimethylaminoethyl methacrylate and N,N-dimethylaminopropyl methacrylamide.

8. The additive composition according to claim 6, wherein the base oil is at least one member selected from the group consisting of API Group I oil, API Group II oil, API Group III oil, API Group IV oil, API Group V oil, and mixtures thereof.

9. The additive composition according to claim 6, wherein the component (A) is present in an amount of 70 to 75% by weight and the component (B) is present in an amount of 25 to 30% by weight.

10. A lubricating oil composition, comprising:
    (A) 85% to 99% by weight of a base oil;
    (B) 0.5% to 10% by weight of a polyalkyl(meth)acrylate based comb polymer, consisting of the following monomers in polymerized form:
       (a) 10% to 20% by weight of an ester of (meth)acrylic acid and a hydroxylated hydrogenated polybutadiene;
       (b) 0% to 1% by weight of methyl methacrylate;
       (c) 60% to 75% by weight of n-butyl methacrylate;
       (d) 10% to 20% by weight of $C_{10-15}$ alkyl methacrylates;
       (e) 0% to 1% by weight of at least one styrene monomer; and
       (f) 0.5% to 3% by weight of at least one nitrogen-containing (meth)acrylate selected from the group consisting of aminoalkyl (meth)acrylates, aminoalkyl(meth)acrylamides, and mixtures thereof;
    (C) 0.5% to 5% by weight of molybdenum-containing friction modifier delivering 0.05 to 0.5% by weight of molybdenum; and
    (D) optionally, one or more further additives.

11. The lubricating oil composition according to claim 10, wherein the component (A) is present in an amount of 88% to 98.5% by weight, the component (B) is present in an amount of 0.5% to 10% by weight, and the component (C) is present in an amount of 1% to 2% by weight, delivering 0.1% to 0.2% by weight of molybdenum, based on the total weight of the lubricating oil composition.

12. The lubricating oil composition according to claim 10 wherein the base oil is an API Group III oil or a mixture thereof.

13. The lubricating oil composition according to claim 10, wherein a friction coefficient is below 0.1.

14. A method of solubilizing molybdenum, the method comprising:
    combining the molybdenum, a base oil, and the polyalkyl (meth)acrylate based comb polymer according to claim 1.

15. The method according to claim 14, wherein 0.05 to 0.5% by weight of the molybdenum is dissolved.

16. The method according to claim 14, wherein the molybdenum is derived from molybdenum dithiocarbamate.

17. The method according to claim 15, wherein 0.05% to 0.2% by weight of the molybdenum is dissolved.

18. A method of making a lubricating oil composition, the method comprising:
    mixing the polyalkyl(meth)acrylate based comb polymer according to claim 1, a molybdenum-containing friction modifier, a base oil, and optionally one or more further additives.

19. The lubricating oil composition according to claim 10, wherein $KV_{40}$ is below 25 mm²/s.

20. A method of increasing molybdenum solubility in a lubricating oil composition, the method comprising:
   combining a base oil and the polyalkyl(meth)acrylate based comb polymer according to claim 1, thereby providing the lubricating oil composition.

* * * * *